United States Patent [19]

Coker et al.

[11] E Re. 31,113

[45] Reissued Dec. 28, 1982

[54] VARIABLE RESISTANCE LIFTING MECHANISM

[76] Inventors: Charles M. Coker, Huntington Beach; Gary M. Kling, Fullerton, both of Calif.

[21] Appl. No.: 112,888

[22] Filed: Jan. 17, 1980

Related U.S. Patent Documents

Reissue of:

[64] Patent No.: 4,093,213
Issued: Jun. 6, 1978
Appl. No.: 767,412
Filed: Feb. 10, 1977

[51] Int. Cl.[3] ..... A63B 21/06

[52] U.S. Cl. ..... 272/118; 272/DIG. 4

[58] Field of Search ..... 272/118, 117, 143, 144, 272/134, 135, 136

[56] References Cited

U.S. PATENT DOCUMENTS 3,612,523 10/1971 Glynn .
3,905,599 9/1975 Mazman ..... 272/118

FOREIGN PATENT DOCUMENTS 2417258 1/1975 Fed. Rep. of Germany ..... 272/118

*Primary Examiner*—Richard C. Pinkham
*Assistant Examiner*—William R. Browne
*Attorney, Agent, or Firm*—Nilsson, Robbins, Dalgarn, Berliner, Carson & Wurst

[57] ABSTRACT

A variable resistance lifting mechanism for increasing the resistive force during an exercise stroke includes a lever arm pivotally attached to a frame at one end and slidably mounted through a linear bearing sleeve at a position remote from the pivot point. In one embodiment, the linear bearing sleeve is connected by a clevis pin to a housing slidable in a linear manner on guide bars. A bar secured to the housing is adapted to be attached to a predetermined number of weights. The weights are also slidable in a linear manner on the guide bars. In a second embodiment, the linear bearing sleeve is pivotally connected by the clevis pin directly to the bar adapted to the attached to the predetermined number of weights. Pivoting of the lever arm by the user causes pivoting of the sleeve with the lever arm about the remote pivot point and simultaneous linear movement of the sleeve and the attached weights so that the lifting force is distributed over a length of the lever arm and the bending force is distributed over a length of the guide bars.

2 Claims, 6 Drawing Figures

VARIABLE RESISTANCE LIFTING MECHANISM

Matter enclosed in heavy brackets [ ] appears in the original patent but forms no part of this reissue specification; matter printed in italics indicates the additions made by reissue.

BACKGROUND OF THE INVENTION

The present invention is directed to a variable resistance lifting mechanism and, more particularly, to a mechanism for a machine which provides the proper increased resistance during an exercise stroke to maintain maximum muscular effort throughout the range of movement of the user.

There are natural changes which occur in the human lever system while performing movements that necessitate different levels of muscular involvement. The variation in muscular force or involvement results from the biomechanical advantages and disadvantages of the human lever system. When the human lever is in the position of greatest biomechanical disadvantage, maximum muscular involvement is required. When the human lever system is at its greatest advantage, minimum muscular force is required.

In order to provide the desired constant maximum muscular involvement throughout an exercise stroke, it is necessary to vary the resistance so that when the human lever is in a position of greatest biomechanical disadvantage, the resistance is at a minimum. Correspondingly, the resistance should be increased as the biomechanical advantage of the human lever system increases. Thus, by properly varying the resistance of the exercise machine during the exercise stroke, it is possible to maintain the same degree of muscular involvement throughout the entire exercise stroke.

Various prior art devices have sought to provide variable resistance during an exercise stroke. The most widely used prior art device includes a cam wheel pivotally mounted to the frame of an exercise machine. This device includes a chain secured tangentially to the cam wheel at one end, wrapped around a roller, and having weights secured to the opposite end of the chain. A lever arm is connected to the cam wheel and a user exerts force against the lever arm to rotate the cam. As the came rotates, the distance from the cam pivot point to the point on the cam surface from which the chain extends tangentially increases. This increases the moment arm of the cam wheel and correspondingly increases the force a user must exert against the lever arm to rotate the cam wheel.

Such cam wheel devices are extremely heavy and require numerous mechanical components which create excessively high moments of inertia. This adverse inertia force becomes the dominant driving force, particularly when the exercise stroke is performed at a rapid speed, and therefore effectively distorts the pattern of increased resistance and effectively prevents constant maximum muscular involvement during the exercise stroke.

In order to avoid the inertia problem of cam wheel devices, a second type of prior art variable resistance exercise device was designed which includes a lever arm pivotally attached to a frame having guide bars. Three rollers are secured to a U-shaped member with two guide rollers adapted to roll directly on the vertical guide bars. The third main roller is adapted to roll on the upper surface of the lever arm passing beneath the third roller and through the U-shaped member. The U-shaped member is rigidly connected to a selector bar which is in turn adapted to be attached to weights which slide on the guide bars. In the operation of such a device, as the user exerts force against the lever arm during the exercise stroke, the lever arm exerts force against the third main roller to lift the U-shaped member and the attached weights. The two guide rollers roll vertically upward on the guide bars to provide linear movement of the weights.

This prior art roller mechanism has two primary disadvantages. The first disadvantage is the tendency of the rollers to wear, thus increasing friction and requiring constant maintenance. The wearing of the two guide rollers prevents them from providing a relatively frictionless surface against the vertical guide bars. The wearing of the third main roller distorts the relatively frictionless surface against the lever arm.

The second disadvantage of the prior art roller mechanism is its creation of adverse bending moments against the vertical guide bars. The two guide rollers cause a localized tangential force against the guide bars at the point of contact the guide rollers with the guide bars which eventually tends to bend the guide bars. Furthermore, the tangential force of the third main roller against the lever arm causes a localized bending force on the lever arm. These bending forces distort the pattern of increased resistance during the exercise stroke thus destroying the object of the device which is to maintain constant maximum muscular involvement throughout the exercise stroke.

SUMMARY OF THE INVENTION

The present invention is directed to a variable resistance lifting mechanism having a frame and guide means. A lever arm is pivotally attached to the frame and is slidably mounted in a linear bearing sleeve at a position remote from the pivot point. The sleeve is pivotally mounted for linear movement within the guide means. Bar means are pivotally connected to the linear bearing sleeve. A plurality of weights are slidably mounted on the guide means and means are provided for attaching a selected number of weights to the bar means. Rotation of the lever arm by the user causes rotation of the linear bearing sleeve with the lever arm about the remote pivot point, and further causes linear movement of the sleeve and of a selected number of weights on the guide means.

BRIEF DESCRIPTION OF THE DRAWINGS

In the drawings which constitute part of this specification, exemplary embodiments demonstrating various features of this invention are set forth wherein.

DESCRIPTION OF THE PREFERRED EMBODIMENT

Figure 2:
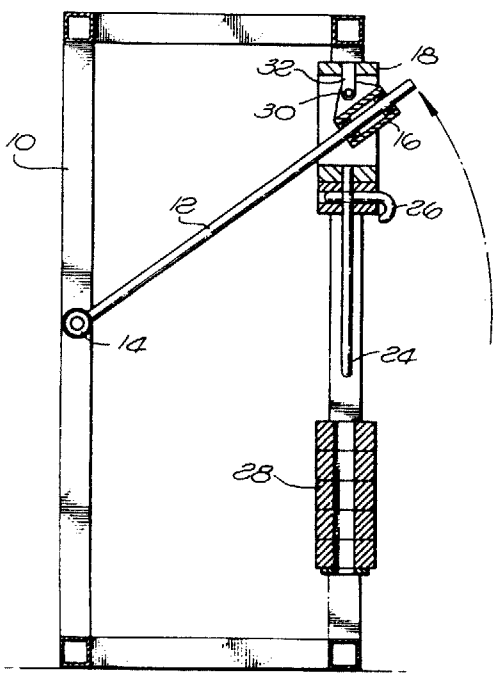
FIG. 2 is a cross-sectional, elevational view of the embodiment of the invention shown in FIG. 1 at the end of an exercise stroke.

The present invention provides a variable resistance lifting mechanism for maintaining the proper resistance during an exercise stroke by eliminating or distributing undesirable forces. The machine includes a lever arm 12, which is pivotally attached to a frame 10 of the machine, and is slidaby mounted in a rotatable, linear bearing sleeve 16 at a position remote from the lever arm pivot point 14. The lever arm 12 is operatively connected to a selector bar 24 which is adapted to be secured to a predetermined number of weights 28. The weights 28 are slidably mounted on guide rails 20 and 22 of the frame.

The sleeve 16 is adapted to distribute the lifting forces exerted by a user over a substantial length of the lever arm 12. The weights 28 are adapted to distribute bending forces over a substantial length of the guide rails. These features of the invention substantially reduce the bending of the lever arm and guide rails which is caused by the rollers of the prior art devices. The present invention thus prevents or reduces distortion of the pattern of variable resistance caused by roller-type prior art devices.

In the first embodiment of the invention, the sleeve 16 is pivotally connected to a housing 18 which is slidably mounted on the guide rails. The housing 18 further provides distribution of bending forces over the guide rails to further reduce the bending effect caused by the roller-type prior art devices. For this latter purpose, the housing top and bottom plates function as do the weight in the second embodiment to be described herein.

Figure 1:
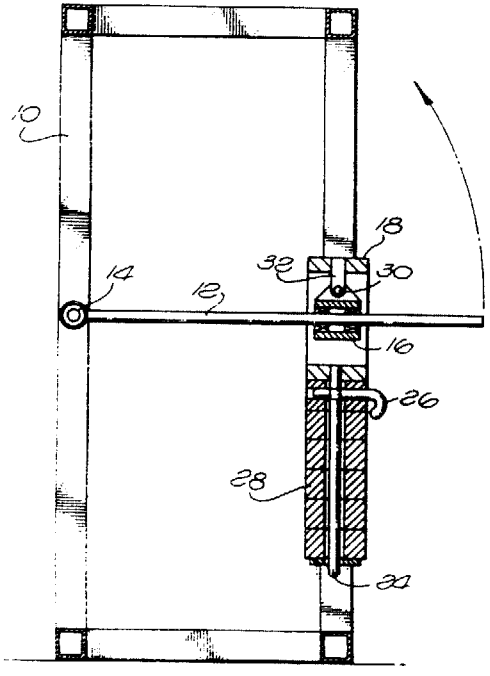
FIG. 1 is a cross-sectional, elevational view of a first embodiment of the invention at the beginning of an exercise stroke.

As shown in FIGS. 1 and 2, the variable resistance lifting mechanism of the present invention includes a frame 10 having a lever arm 12 attached to the frame at a pivot point 14. The lever arm is slidably mounted in a rotatable linear bearing sleeve 16 at a point remote from the pivot 14. The distance from the pivot point 14 to the sleeve 16 along the arm 2 is at a minimum at the beginning of the exercise stroke, as shown in FIG. 1, and the distance increases to a maximum at the end of the exercise stroke, as shown in FIG. 2. The device is thus constructed to provide variation in resistance from the beginning of the exercise stroke to the end of the exercise stroke in accordance with biomechanial research known in the art. This provides a constant maximum muscular force throughout the exercise stroke.

Figure 3:
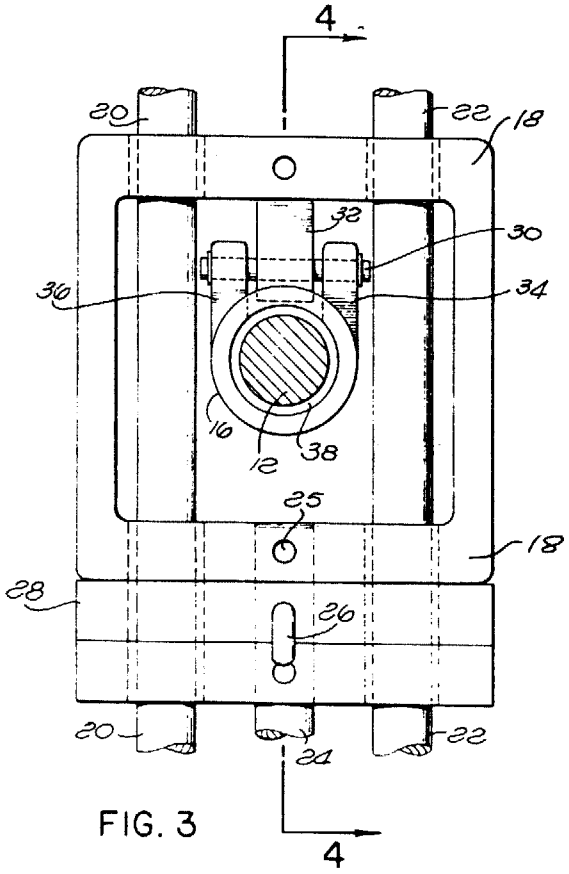
FIG. 3 is a cross-sectional, elevational view of various details of the first embodiment of the invention shown in FIG. 1.
Figure 4:
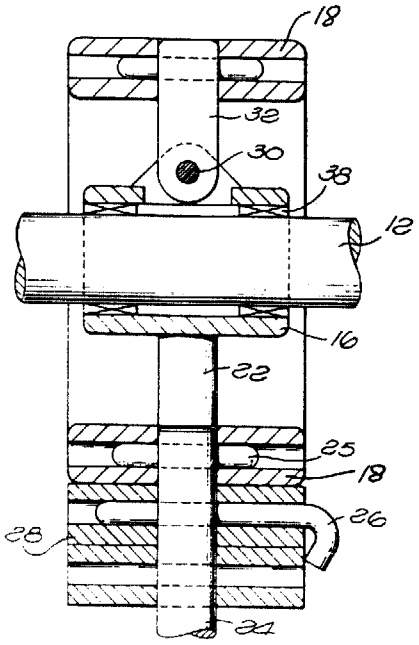
FIG. 4 is a cross-sectional, elevational view taken along the line 4—4 of FIG. 3.

In the first embodiment of the invention, shown in FIGS. 1–4, the housing 18 is slidably mounted on guide bars or rails 20 and 22 as is shown in greater detail in FIGS. 3 and 4. The housing 18 has top and bottom plates, each about 1.5 inches thick, and a selector bar 24 attached to the lower or bottom plate by a roll pin 25. A plurality of weights 28, each about 1.5 inches thick, are slidably mounted on the guide bars 20 and 22 and a selector pin 26 is adapted to attach a selected number of the weights 28 to the selector bar 24, as is shown in FIG. 4.

The sleeve 16 incorporates suitable low friction annular bearings 38, which are formed of nylon, Teflon, or the like. The sleeve 16 is four inches in length and the two bearings 38 are each one inch in length. The sleeve 16 has integral ears 34 and 36 which have horizontal bores through which a clevis pin 30 is fitted. The clevis pin 30 also passes through a horizontal bore in the housing arm 32 to pivotally secure the sleeve 16 to the housing 18. The clevis pin 30, as shown in FIG. 3, extends slightly beyond both ears 34 and 36, and the ears 34 and 36 have a slight tolerance between their respective inner surfaces and the housing arm 32. In this manner, the clevis pin permits a limited amount of lateral movement of the sleeve 16 with respect to the rear pivot point 14 to accommodate a slight lateral movement of the lever arm 12 at the pivot point 14 which would otherwise cause bending of the clevis pin 30. This construction of the clevis pin 30 permits lateral movement of the linear bearing sleeve with respect to the pivot point 14 to maintain alignment of the lever arm 12 between the sleeve 16 and the pivot point 14. Maintaining this alignment of the lever arm 12 prevents bending of the clevis pin 30.

In operation of the first embodiment of the invention shown in FIGS. 1–4, the lever arm 12 is initially in the position shown in FIG. 1. The selector pin 26 is inserted through the horizontal bore of a weight and a corresponding horizontal bore of the selector bar 24. As the user lifts the lever arm 12, the sleeve 16 and the housing 18 are raised and the sleeve 16 rotates with the lever arm about the pivot point 14 to the position shown in FIG. 2. At the same time, the selected number of weights are lifted linearly upward on the guide bars 20 and 22 by the selector pin 26 and selector bar 24 attached to the housing 18. Since the length of the lever arm between the pivot point 14 and the sleeve 16 is increased during the stroke, the lifting force required to be exerted against the end of the arm 12 remote from the pivot 14 increases during the stroke to thereby provide a variable resistance during the exercise stroke.

The sleeve 16 is adapted to distribute the lifting force over a length of the lever arm 12 throughout the exercise stroke to thereby substantially reduce the bending forces applied tangentially against the lever arm 12 by the prior art roller-type devices. In addition, the weights 28 which move linearly on the guide bars 20 and 22 further distribute the forces over the guide bars 20 and 22. This substantially reduces the local bending forces against the guide bars 20 and 22 caused by rollers used in prior art devices. Finally the housing 18 further distributes the bending forces against the guide bars when the weights are moved linearly on the guide bars.

Figure 6:
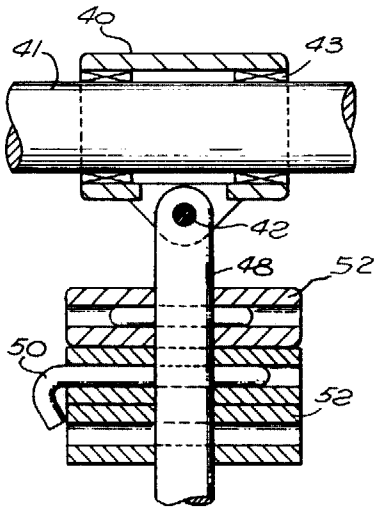
Figure 5:
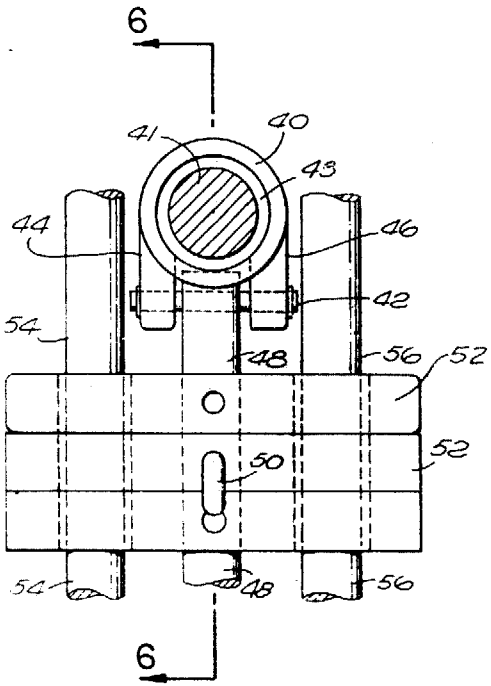
FIG. 5 is a cross-sectional elevational view of various details of a second embodiment of the invention wherein the sleeve is directly connected to the selector bar; and, FIG. 6 is a cross-sectional, elevational view taken along the line 6—6 of FIG. 5.

In the second embodiment of this invention, shown in FIGS. 5 and 6, a linear bearing sleeve 40 slidably surrounds lever arm 41. The sleeve 40, incorporating bearings 43 as previously described, is pivotally connected by a clevis pin 42 to a selector bar 48. The sleeve 40 includes ears 44 and 46 having horizontal bores to receive the clevis pin 42. The clevis pin 42 is fitted through the bores in the ears and through a horizontal bore in the selector bar 48 to provide a pivotal connection. A selector pin 50 is provided to attach a desired number of weights 52 to the bar 48 as previously described. The weights 52 are slidably mounted on guide bars 54 and 56. When a user rotates the lever arm 41, the linear bearing sleeve 40 moves linearly between the guide bars and is rotated about the remote lever arm pivot point. Simultaneously, the selected number of weights 52 are moved linearly on guide bars 54 and 56.

The second embodiment of the invention shown in FIGS. 5 and 6 eliminates the housing 18 of the first embodiment, shown in FIGS. 1 through 4, while providing the same benefits of distributing the lifting forces over a length of the lever arm 41 as well as distributing the bending forces against the guide bars 52 and 54 to thereby substantially reduce the bending of the lever arm and the guide bars. This reduces the distortion of the desired pattern of variable resistance over the exercise stroke.

It will be apparent that various modifications and changes may be made in the disclosed embodiments, all within the scope of the invention as defined by the following claims.

What is claimed is:

[1. A variable resistance lifting mechanism, comprising:

a frame having means for guiding the movement of weights:

lever arm means pivotally attached to said frame at a pivot point and constructed to permit substantially only reciprocation of said lever arm means with respect through a sleeve means when said lever arm means as pivoted by a user a pivotable, linear bearing sleeve means for receiving said lever arm means in telescoping relationship, said sleeve means being mounted at a position remote from said lever arm means pivot point, said sleeve means being mounted for linear movement within said guide means and for simultaneous pivotal with respect to said frame to maintain alignment with said lever arm, said sleeve means simultaneously distributing a user's lifting forces over a substantial length of the respective lever arm means during lifting of the lever arm means bar weight supporting means pivotally connected to said each linear bearing sleeve means;

a plurality of weights slidably mounted for linear movement of said guide means, said weight having adapted to distribute the forces against said guide means over a length of said guide means; and, means for attaching a selected number of said weights to said bar means, whereby pivoting by a user of said lever arm means about its pivot point causes pivoting said linear bearing sleeve means with respect to said guide means and simultaneous linear movement of said sleeve means and of said weights on said guide means.]

[2. The mechanism as defined in claim 1, further comprising a housing slidably mounted on said guide means and adapted to connect said linear bearing sleeve to said bar means, said housing providing further simultaneous distribution of the bending forces over a longitudinal length of said guide means as said weights and housing are moved linearly on said guide means.]

3. [The mechanism as defined in claim 2, further comprising] *A variable resistance lifting mechanism, comprising:*

*a frame having means for guiding the movement of weights;*

*lever arm means pivotally attached to said frame at a pivot point and constructed to permit substantially only reciprocation of said lever arm means through a sleeve means when said lever arm means is pivoted by a user;*

*a pivotable, linear bearing sleeve means for receiving said lever arm means in telescoping relationship, said sleeve means being mounted at a position remote from said lever arm means pivot point, said sleeve means being mounted for linear movement within said guide means and for simultaneous pivotal movement with respect to said frame to maintain alignment with said lever arm, said sleeve means simultaneously distributing a user's lifting forces over a substantial length of the lever arm means during lifting of the lever arm means;*

*bar weight supporting means pivotally connected to said linear bearing sleeve means;*

*a plurality of weights slidably mounted for linear movement on said guide means, said weight being adapted to distribute the forces against said guide means over a length of said guide means;*

*means for attaching a selected number of said weights to said bar means,*

*whereby pivoting by a user of said lever arm means about its pivot point causes pivoting of said linear bearing sleeve means with respect to said guide means and simultaneous linear movement of said sleeve means and of said weights on said guide means;*

*a housing slidably mounted on said guide means and adapted to connect said linear bearing sleeve to said bar means, said housing providing further simultaneous distribution of the bending forces over a longitudinal length of said guide means as said weights and housing are moved linearly on said guide means; and* a clevis pin pivotally connecting said linear bearing sleeve means to said housing.

4. [The mechanism as defined in claim 1, further comprising] *A variable resistance lifting mechanism, comprising:*

*a frame having means for guiding the movement of weights;*

*lever arm means pivotally attached to said frame at a pivot point and constructed to permit substantially only reciprocation of said lever arm means through a sleeve means when said lever arm means is pivoted by a user;*

*a pivotable, linear bearing sleeve means for receiving said lever arm means in telescoping relationship, said sleeve means being mounted at a position remote from said lever arm means pivot point, said sleeve means being mounted for linear movement within said guide means and for simultaneous pivotal movement with respect to said frame to maintain alignment with said lever arm, said sleeve means simultaneously distributing a user's lifting forces over a substantial length of the lever arm means during lifting of the lever arm means;*

*bar weight supporting means pivotally connected to said linear bearing sleeve means;*

*a plurality of weights slidably mounted for linear movement on said guide means, said weight being adapted to distribute the forces against said guide means over a length of said guide means;*

*means for attaching a selected number of said weights to said bar means,*

*whereby pivoting by a user of said lever arm means about its pivot point causes pivoting of said linear bearing sleeve means with respect to said guide means and simultaneous linear movement of said sleeve means and of said weights on said guide means; and* a clevis pin pivotally connecting said linear bearing sleeve means to said bar means.

[5. A variable resistance lifting mechanism as defined in claim 1 wherein said bar means includes a plurality of pin receiving holes and said bar means passes through apertures in each of said weights, said means for attaching comprising a pin connecting a selected number of said weights to said bar means, whereby said weights simultaneously distribute the lifting forces against said guide means over a longitudinal length of said guide means.]

* * * * *

UNITED STATES PATENT AND TRADEMARK OFFICE

CERTIFICATE OF CORRECTION

PATENT NO. : Re. 31,113

DATED : December 28, 1982

INVENTOR(S) :

CHARLES M. COKER; GARY M. KLING

It is certified that error appears in the above-identified patent and that said Letters Patent are hereby corrected as shown below:

On the title page the following should be added:

--Assignee: PARAMOUNT HEALTH EQUIPMENT CORP., Los Angeles, Calif.--

Column 5, line 19, delete "as" and insert --is--.

Signed and Sealed this

Twenty-third Day of August 1983

[SEAL]

Attest:

GERALD J. MOSSINGHOFF

Attesting Officer

Commissioner of Patents and Trademarks